US012065096B1

(12) United States Patent
Lopez Martinez et al.

(10) Patent No.: US 12,065,096 B1
(45) Date of Patent: Aug. 20, 2024

(54) VEHICLE INTERIOR PANEL FOR USE OVER AN AIRBAG

(71) Applicant: Faurecia Interior Systems, Inc., Auburn Hills, MI (US)

(72) Inventors: Carlos Gerardo Lopez Martinez, Puebla (MX); Cesar Alvarez, Puebla (MX)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 0 days.

(21) Appl. No.: 18/244,907

(22) Filed: Sep. 11, 2023

(51) Int. Cl.
*B60R 21/215* (2011.01)

(52) U.S. Cl.
CPC .. *B60R 21/215* (2013.01); *B60R 2021/21537* (2013.01)

(58) Field of Classification Search
CPC ........ B60R 21/215; B60R 2021/21537; B60R 21/20; B60R 21/201
See application file for complete search history.

(56) References Cited

FOREIGN PATENT DOCUMENTS

| DE | 102009048686 A1 | 4/2011 |
|----|-----------------|--------|
| EP | 2558335 A1 | 2/2013 |

*Primary Examiner* — Jason D Shanske
*Assistant Examiner* — Matthew James O'Neill
(74) *Attorney, Agent, or Firm* — Reising Ethington P.C.

(57) ABSTRACT

A vehicle interior panel with an airbag net having a strategically configured reinforcement fold. The vehicle interior panel includes an airbag lid configured to cover a deployable airbag and an adjacent panel portion situated adjacent to the airbag lid. The panel includes an airbag net having a hinge that forms between a first net segment on a first side of the hinge and a second net segment on a second, opposite side of the hinge. The first net segment is coupled to the adjacent panel portion and the second net segment is coupled to the airbag lid. The airbag net includes a reinforcement fold, the reinforcement fold extending through the hinge from the first net segment to the second net segment.

15 Claims, 5 Drawing Sheets

VEHICLE INTERIOR PANEL FOR USE OVER AN AIRBAG

TECHNICAL FIELD

The present disclosure is related generally to vehicle interiors components and, more particularly, to panels positioned over airbags designed to deploy through the panels.

BACKGROUND

Personal automotive vehicles are usually equipped with airbags configured to quickly inflate inside the passenger cabin of the vehicle in the event of a severe vehicle collision. Due to the nature of such collisions, airbags are designed to change from a folded state, hidden behind a vehicle interior panel, to a fully inflated stated in less than one-tenth of a second. During that short time period, the airbag must also typically break through the overlying interior panel, which is typically an upholstered plastic panel. Such panels are carefully engineered to break in a controlled manner so that the airbag is impeded as little as possible and so that the overlying panel does not break into multiple pieces during deployment.

An airbag net can be used to help selectively control formation of the airbag lid from out of the interior panel when the airbag is deployed. The airbag net helps create a hinge between the airbag lid and the adjoining or adjacent panel portion. To reinforce the hinge, multiple layers of airbag nets may be used, and folds may be incorporated along the primary hinge portion. EP2558335 B1, to Audi and Faurecia Innenraum Systeme, for example, shows a folded reinforcement along the length of the hinge. However, more selectively locating a reinforcement area can help minimize costs and provide enhanced structural integrity in other areas with respect to the airbag lid.

SUMMARY

In accordance with various embodiments, a vehicle interior panel includes an airbag lid configured to cover a deployable airbag and an adjacent panel portion situated adjacent to the airbag lid. The panel includes an airbag net having a hinge that forms between a first net segment on a first side of the hinge and a second net segment on a second, opposite side of the hinge. The first net segment is coupled to the adjacent panel portion and the second net segment is coupled to the airbag lid. The airbag net includes a reinforcement fold, the reinforcement fold extending through the hinge from the first net segment to the second net segment.

In various embodiments, the reinforcement fold has at least three overlapping layers.

In various embodiments, the reinforcement fold has an S-shaped cross-section.

In various embodiments, the reinforcement fold has two sections, with each section having at least three overlapping layers.

In various embodiments, the reinforcement fold has an omega-shaped cross-section.

In various embodiments, each of the first net segment and the second net segment are a single layer of the airbag net.

In various embodiments, the airbag net has a first side edge, a second side edge, a third side edge, and a fourth side edge, and wherein the third side edge is an end of the first net segment and the fourth side edge is an end of the second net segment.

In various embodiments, the hinge extends fully from the first side edge to the second side edge.

In various embodiments, the reinforcement fold extends fully from the third side edge to the fourth side edge.

In various embodiments, there is a central section between the first side edge and the second side edge, wherein the central section includes a center point between the first side edge and the second side edge, the central section having a length between the first side edge and the second side edge that is less than 50% of a total distance between the first side edge and the second side edge.

In various embodiments, the reinforcement fold is located fully within the central section.

In various embodiments, the first side edge and the second side edge are configured to extend at least partially in an X-direction with respect to a vehicle.

In various embodiments, a longest extent of the reinforcement fold is configured to extend at least partially in the X-direction with respect to the vehicle.

In various embodiments, the hinge is a fold which angles the first net segment with respect to the second net segment.

In various embodiments, the reinforcement fold is located along an initial impact zone where the deployable airbag is configured to make initial contact with the airbag lid.

It is contemplated that any number of the individual features of the above-described embodiments and of any other embodiments depicted in the drawings or description below can be combined in any combination to define an invention, except where features are incompatible.

BRIEF DESCRIPTION OF THE DRAWINGS

Illustrative embodiments will hereinafter be described in conjunction with the following figures, wherein like numerals denote like elements, and wherein.

DESCRIPTION OF ILLUSTRATIVE EMBODIMENTS

Described below is a vehicle interior panel having a molded-in airbag lid and an airbag net to help selectively control formation of the lid during deployment of the airbag. The airbag net has a reinforcement fold that extends in the tensile direction and is more strategically positioned to account for the airbag lid opening effort. As opposed to folds that are located or aligned with the hinge, the reinforcement fold of the present airbag net extends along a central section, transverse to the hinge, to help add structural integrity where the stress of the airbag is initially located. The presently described panels obviate the need of an entire, double layer net, and can be implemented quickly with minimal adjustments to the overall manufacturing process for the panel.

Additionally, these arrangements can be more cost effective and save in material usage compared with prior strengthening solutions.

Figure 1:
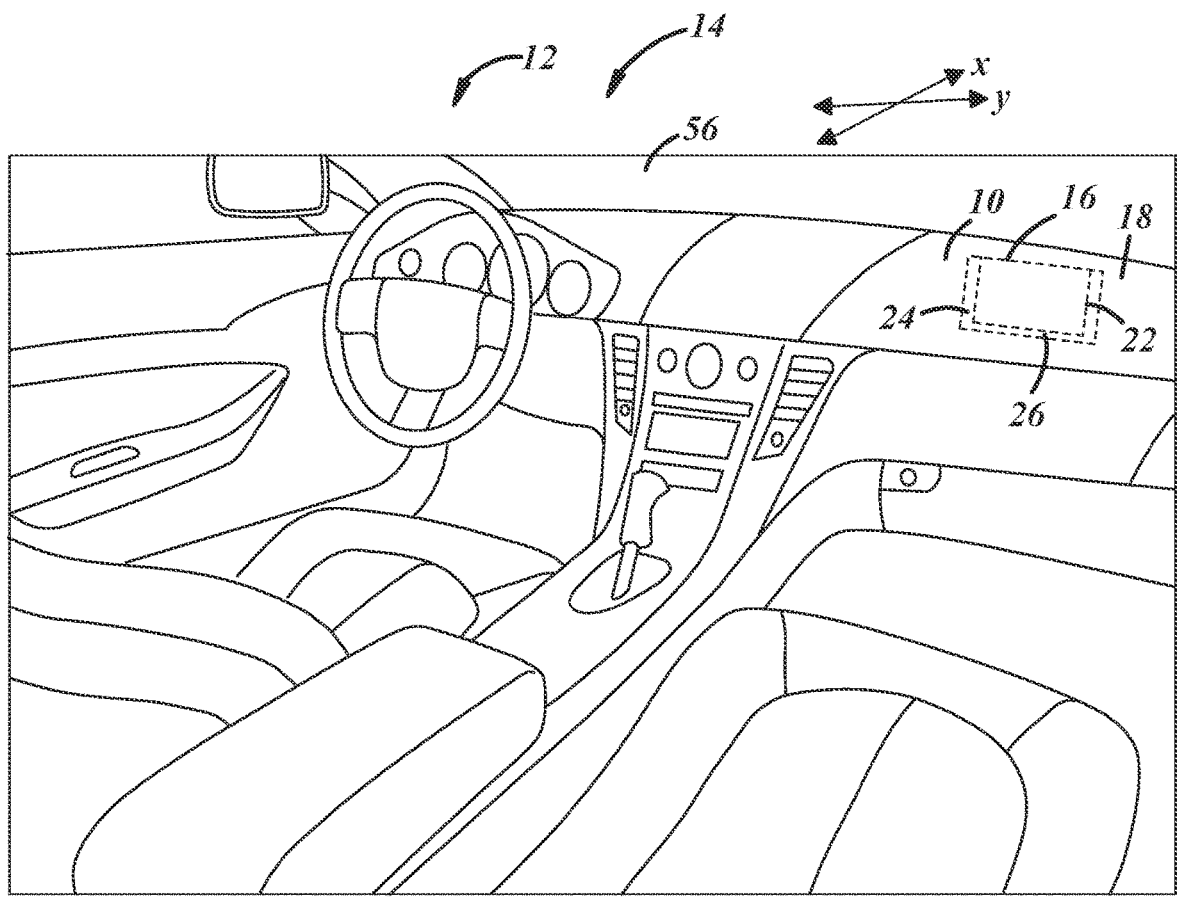
FIG. 1 shows an example vehicle interior panel having an airbag lid, according to one embodiment.

FIG. 1 schematically shows a vehicle interior panel 10, such as an instrument panel made for installation along a front end of a vehicle passenger cabin 12 and spanning at least a portion (e.g., 40-100%) of the transverse width of the cabin. When installed in a vehicle 14, the panel 10 overlies an airbag module 16 configured to inflate an airbag in the event of a vehicle collision. The panel 10 may include a decorative trim layer 18 (e.g., a foam-backed TPU layer or spacer fabric-backed leather) covering at least the illustrated portion of the panel when installed in the vehicle 14.

Figure 2:
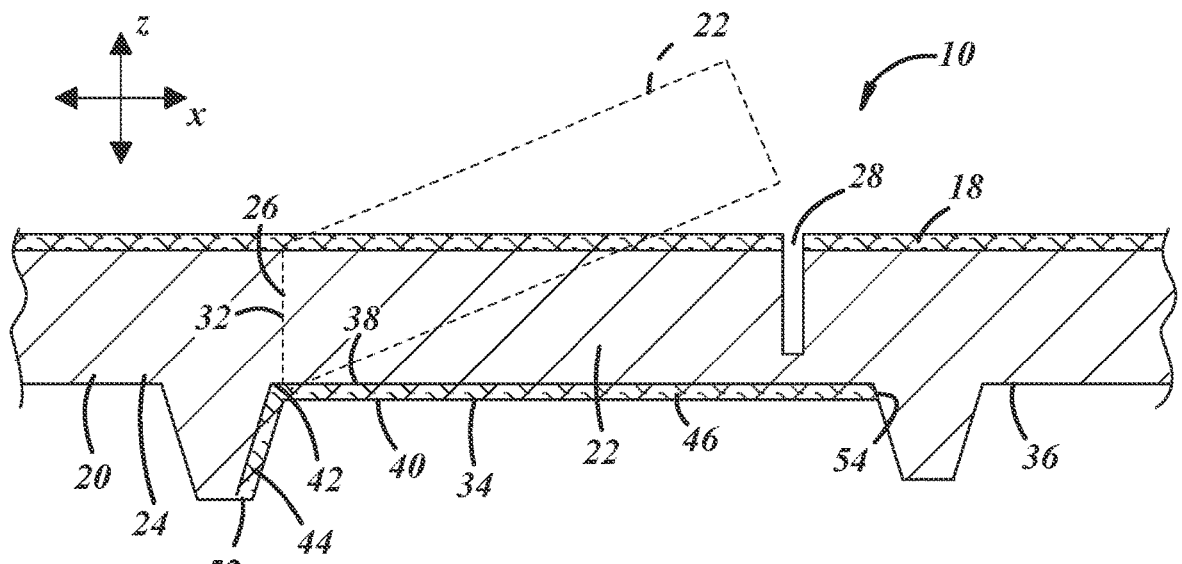
FIG. 2 is a cross-section view of part of the panel of FIG. 1.
Figure 3:
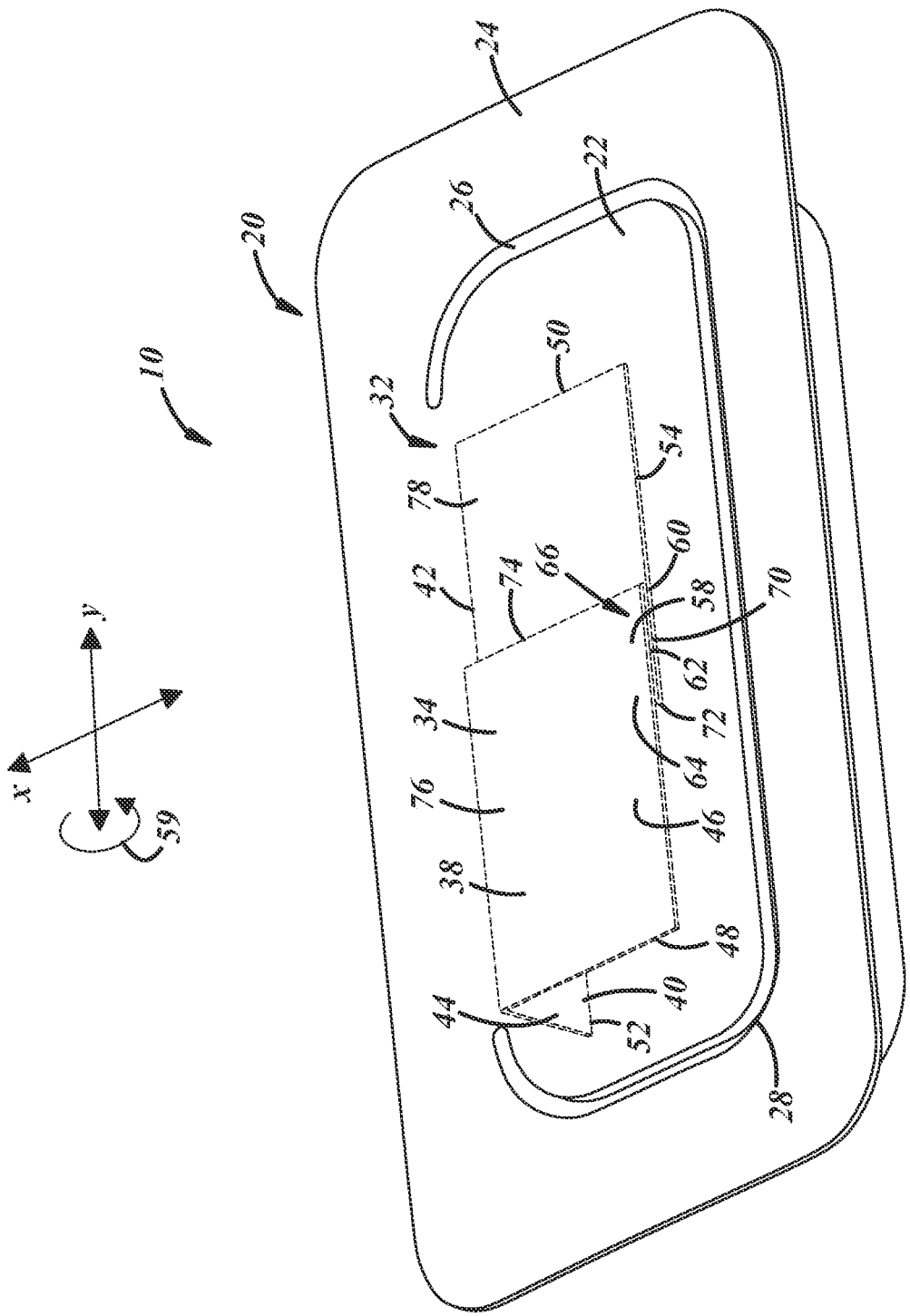
FIG. 3 shows an airbag net of the vehicle interior panel of FIG. 1 according to one embodiment.

As shown in FIGS. 2 and 3, the panel 10 has a substrate 20 in which an airbag lid 22 is formed, with the airbag lid 22 being situated next to an adjacent panel portion 24. The substrate 20 is typically molded from a polymer-based material such as a mineral-reinforced polyolefin, a polycarbonate alloy, a thermoplastic elastomer (TPE), or a thermoplastic olefin (TPO). The airbag lid 14 is a molded-in feature of the panel 10, meaning that the airbag door is formed together with the adjacent panel portion 24 in the same mold cavity and from the same material as one continuous piece. The adjacent panel portion 24 may be another part of the substrate 20 as shown, part of an airbag module, etc., so long as it is directly or indirectly outside the bounds of the airbag lid 22.

The airbag lid 22 has a perimeter 26 that at least partly defines a deployment opening through which the underlying airbag deploys into the passenger cabin 12. In the case of an instrument panel, the substrate 20 is embodied as the portion of the molded panel 10 outside of and surrounding the airbag lid 22. These teachings are also applicable to interior panels in the form of a drop-in or backside airbag chute assembly having a frame configured for attachment to an instrument panel at a deployment opening formed through the panel. Door panels, roof panels, steering wheel panels, knee adjacent panels, and seat panels are some other non-limiting examples of applicable interior panels.

The airbag lid 22 may have one or more channels or perforations 28 that extend fully or partially into the substrate 20. The channel 28 generally extends around the perimeter 26 to help control strategic opening of the lid 22 during deployment of the airbag 30. The channel 28 only extends partially around the airbag lid 22, leaving a hinge region 32. In the illustrated embodiment, the airbag lid 22 is U-shaped, having a U-shaped tear seam as shown by the configuration of the channel 28. However, the illustrated configurations and shapes of the panel 10 are non-limiting. For example, there may be no pre-weakening in the substrate 20, or the pre-weakening could be formed from a series of through-openings in the substrate 20, a series of blind laser-formed holes, or any other suitable feature that causes the substrate to split along that feature to form the airbag lid(s) 22. The substrate 20 may also be configured to split along the hinge region 32 but can include tethers that anchor the airbag lid 22 to the adjacent panel portion 24 at the hinge. Different tear seam shapes, such as H-shaped, X-shaped, Y-shaped, or curvilinear shapes are also possible. An X-shaped tear seam, for example, may be used to form four triangular airbag lids with their apexes at the center of the X-shape, for example. One or more layers of the decorative trim layer 18 may include a tear seam as well.

The airbag lid 22 has an outer surface generally in the same plane or along the same contour as the adjacent panel portion 24 of the substrate 20. The airbag lid 22 may include other features such as a network of stiffening ribs along one or both of the illustrated outer surface and the opposite inner surface. The airbag lid 22 is attached to the adjacent panel portion 24 at the hinge region 32 along the perimeter 26. In this example, the hinge region 32 is along one of the long sides of the rectangular perimeter 26. These may be molded-in features or features added after the panel 10 is molded or otherwise formed.

The hinge region 32 is configured to stay intact and to maintain attachment of the lid 22 to the adjacent panel portion 24 during airbag deployment. This may be accomplished in part by the hinge region 32 being continuous along its length, by minimizing the number of through-openings along the hinge region 32, and/or by providing the hinge region 32 in a flexible shape that tends to bend rather than break.

Figure 4:
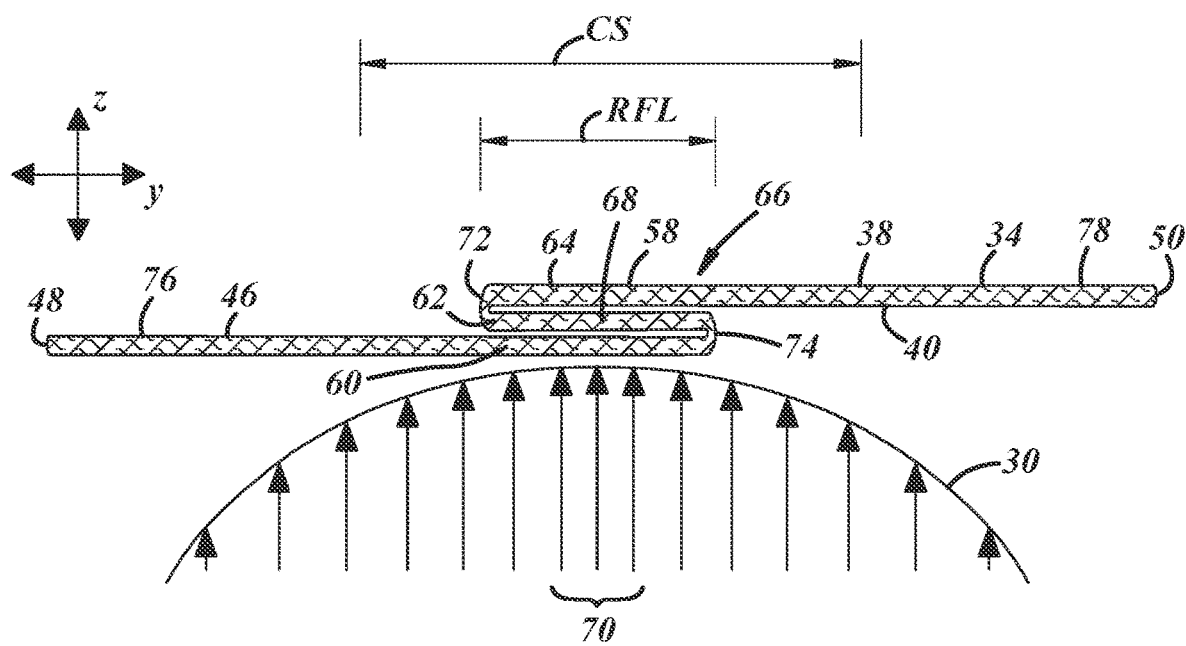
FIG. 4 is a cross-section view of the airbag net of FIG. 3.

With reference to FIGS. 2-4, an airbag net 34 is provided to help maintain attachment of the airbag lid 22 to the adjacent panel portion 24 during deployment of the airbag 30, even if the molded plastic portion at the hinge region 32 fractures. The airbag net 34 is thus a reinforcing layer of the hinge region 32 and extends at least across the hinge region (in the Y-direction). The airbag net 34 may be glued or otherwise attached to the substrate 20, or may be at least partially embedded in the material of the substrate 20. It is also possible to omit plastic material at the hinge region 32 so that the airbag net 34 is itself the hinge.

The airbag net 34 is located on an outboard side 36 of the substrate 20 to structurally reinforce the hinge region 32. The airbag net 34 has an inboard side 38 and an outboard side 40, with the inboard side 38 being attached to the outboard side 36 of the substrate 20 at the location of the airbag lid 22. The airbag net 34 may be located fully within the perimeter 26 of the airbag lid 22, or in some embodiments, may extend at least partially beyond the perimeter 26. Advantageously, the airbag net 34 extends fully along the hinge region 32 in the Y-direction, as shown in FIG. 3. This arrangement helps ensure that the airbag lid 22 does not detach from the airbag net 34, such as during deployment of the airbag 30.

As a reinforcing layer, the airbag net 34 may be made from a material stronger than the plastic material for the substrate 20 and/or in a stronger form, such as a sheet of fibers. In one example, the airbag net 34 comprises or is made entirely from aramid fibers. Aramid fibers or an aramid fiber blend may be in the form of a woven fabric sheet, a melt-bonded mesh, or in a unitary extruded net form. The airbag net 34 may include any flexible sheet of uniformly arranged stranded material with openings between the strands that are at least as wide as the strands. As an example, strands of aramid fibers having a diameter of 0.5 mm woven together with 0.5 mm or larger spaces between strands can constitute an airbag net 34. The airbag net 34 may also be a woven or non-woven fabric layer comprising natural fibers, synthetic fibers, glass fibers, or carbon fibers, to name a few examples. The airbag net 34 may also be formed from metallic materials, such as a metal wire mesh or metallic fabric, a metal foil, or thin sheet metal. In one embodiment, the airbag net 34 is a reinforcing layer made from a polyester (e.g., PET, PBT, 1100 DTEX, 2200 DTEX). Advantageously, in some embodiments, the airbag net 34 has an elongation of about 15%, and not less than 5%.

With reference to FIGS. 2 and 3, the airbag net 34 has a hinge 42 with a first net segment 44 on a first side of the hinge and a second net segment 46 on a second, opposite side of the hinge. In the illustrated embodiment, the hinge 42 of the airbag net 34 extends in the Y-direction and is aligned with the hinge region 32 of the airbag lid 22. The first net segment 44 is coupled to the adjacent panel portion 24, and the second net segment 46 is coupled to the airbag lid 22. The first and second net segments 44, 46 may be indirectly coupled to the panel 10, such as via one or more adhesive layers or the like, or may be directly coupled to the panel, such as molded-in or otherwise integrated. In one embodiment, the inboard side 38 of the airbag net 34 is attached to the substrate 20 such that the hinge 42 is a fold that angles the first net segment 44 with respect to the second net segment 46.

As shown more particularly in FIG. 3, the airbag net 34 includes a first side edge 48 and an opposite second side edge 50, as well as a third side edge 52 and an opposite fourth side edge 54. The airbag net 34 in this embodiment has a rectangular shape with the first and second side edges 48, 50 being shorter in length than the third and fourth side edges 52, 54. Additionally, the hinge 42 extends fully between the first and second side edges 48, 50, and in some embodiments, may extend beyond the hinge region 32 of the airbag lid 22. The hinge 42 may extend fully between the first and second side edges 48, 50, while also containing other features, such as various cut throughs or material bridges to help selectively control opening and attachment of the portions of the panel 10.

In the illustrated embodiment, the first and second side edges 48, 50 are configured to be at least partially aligned with the X-direction of the vehicle 14, and the third and fourth side edges 52, 54 are configured to be at least partially aligned with the Y-direction of the vehicle. In this arrangement, the hinge 42 of the airbag net 34 and the hinge region 32 of the airbag lid 22 are generally parallel to a longest extent of the windshield 56, in the Y-direction. Additionally, the longest extent of the airbag net 34 is aligned with the hinge 42 extending in the Y-direction.

The airbag net 34 includes a strategically located reinforcement fold 58. In prior implementations, the airbag net 34 was reinforced using a double-layer structure, as opposed the primarily single layer structure shown in the illustrated embodiments. Or, a reinforcement fold 58 was located in-line with the hinge 42 (i.e., in the Y-direction). In this implementation, however, the reinforcement fold 58 is structured to extend through the hinge 42, as opposed to along the hinge, from the first net segment 44 to the second net segment 46. Accordingly, the reinforcement fold 58 is configured to extend partially in the X-direction, and in this embodiment, extends fully in the X-direction, extending fully between the third side edge 52 and the fourth side edge 54. This arrangement is particularly advantageous as the reinforcement fold 58 is better positioned to increase the strength of the airbag net 34 in the tensile direction and is more responsive to the tensile forces generated by the airbag 30 during opening of the airbag lid 22. As shown in FIG. 3, designated with arrow 59, the airbag lid 22 is configured so as to rotate about the Y-axis compared to the chute, thus making the Y-axis a rotation axis. The reinforcement fold 58 is configured to be perpendicular to the lid rotation axis or Y-axis.

As shown more particularly in FIG. 4, the reinforcement fold 58 is structured to have at least three overlapping layers, 60, 62, 64. In this embodiment, the reinforcement fold 58 has an S-shaped cross-section 66. This arrangement, extending transverse through the hinge 42, helps increase the strength of the airbag net 34 three times, and locating the reinforcement fold 58 in the tensile direction related to the airbag lid 22 opening effort can help with localized strength increases. Additionally, the transversal modification of the net 34 to control opening of the lid can improve the panel 10 when used with more modern airbags 30. In previous implementations, the airbag was much smaller (e.g., 60 L), and opened slower (e.g., 12 msec), as opposed to an airbag 30 that is proportionally quite larger (e.g., 140 L) and opens much faster (e.g., 2 msec). Locating the reinforcement fold 58 in a direction that is transverse to the hinge 42 helps accommodate these increases in size and decreases in deployment time for the airbag 30. If the panel 10 is modified to have an H-shape, for example, as opposed to the illustrated U-shape for the airbag lid 22, the reinforcement fold 58 and the hinge 42 may be structured opposite to what is shown in the illustrated example. However, the reinforcement fold 58 would still be oriented generally perpendicular with respect to the hinge 42.

FIG. 4 shows that the reinforcement fold 58 is located in a central section CS between the first side edge 48 and the second side edge 50. The central section CS includes a center point 68 between the first side edge 48 and the second side edge 50, in the middle of the second overlapping layer 62. The central section CS has a length between the first side edge 48 and the second side edge 50 that is less than 50% of a total distance between the first side edge and the second side edge. Even more advantageously, the length RFL of the reinforcement fold 58 between the first side edge 48 and the second side edge 50 is fully located within the central section CS. The location of the three overlapping layers 60, 62, 64 within this central section CS helps triple the strength in an initial impact zone 70 where the airbag 30 deploys. This length RFL of the reinforcement fold 58 may be customized depending on the functional requirements for the panel 10. Additionally, while the reinforcement fold 58 is strategically located in the airbag net 34, it is possible to locate other folds, bends, etc. in the net, depending on the desired implementation.

Figure 5:
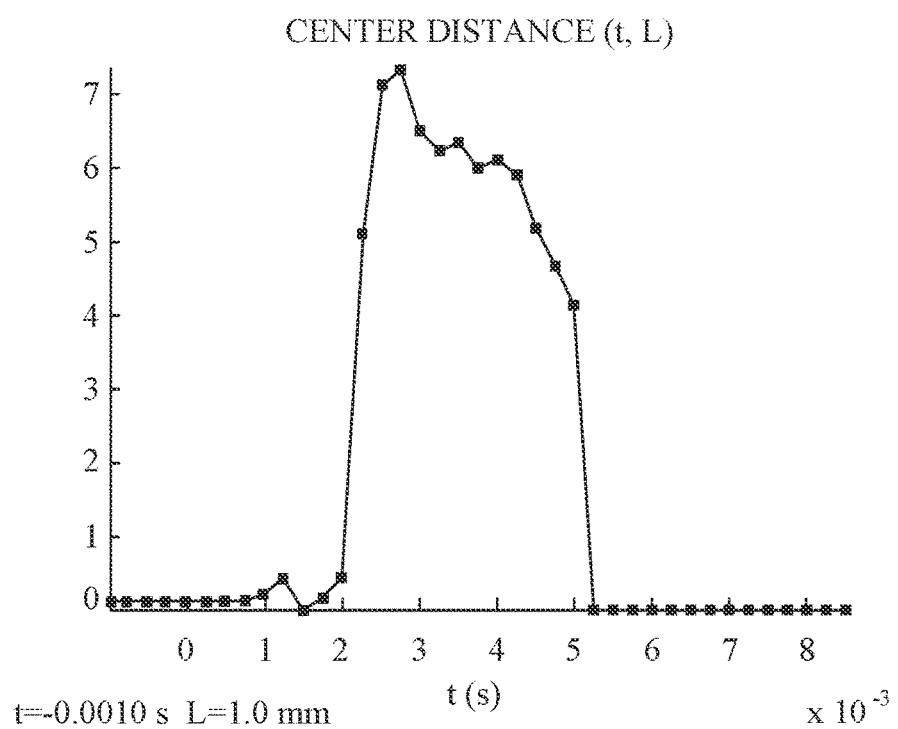
FIG. 5 is a graph showing an example of an airbag test result, showing the tendency of much higher opening effort in the lid center area which is an impulse presented in +Z direction displacement compared to the lateral lid sides of the airbag lid.

The forces that develop on the hinge 42 of the airbag net 34 typically grow from the lid-center zone at the initial impact zone 70 and the central section CS in a cross-car direction (Y-direction) to the lid-sides zones located along the first and second side edges 48, 50. The vertically projecting arrows in FIG. 4 schematically represent a force development profile for the airbag 30, and also illustrates the kinematic airbag interaction between the module and the lid 22. FIG. 5 illustrates how quickly the panel 10 deforms as the airbag 30 contacts the outboard side 40 of the airbag net 34 and expands through the airbag lid 22. Locating the reinforcement fold 58 in the central section CS, transverse to the cross-car direction, can help improve the connection between the airbag lid 22 and the adjacent panel portion 24 via the triple strength along the initial impact zone 70. Additionally, a first end 72 of the reinforcement fold 58 and a second end 74 of the reinforcement fold are strategically located within the central section CS and yet extend beyond the initial impact zone 70. As with the reinforcement fold 58 itself, both the first end 72 and the second end 74 extend in a direction transverse to the hinge 42 (in the illustrated embodiments, in the X-direction, and more particularly, perpendicular to the hinge 42). After the contact of the cushion of the airbag 30 and airbag lid 22 of the panel 10, tensile forces start to develop exponentially on the net hinge 42 and the hinge region 32, and the location of the reinforcement fold 58 can help prevent the strength of airbag net from being undesirably overcome, compared with folds extending in other locations or along/aligned with the hinge.

The reinforcement fold 58 may be formed in the airbag net 34 prior to its attachment to the substrate 20, or during attachment. To cite one example, the net 34 may be pre-folded before putting onto a conveyer or into a molding tool, and the molding tool can be used to impart heat and pressure to help maintain the reinforcement fold 58. In other embodiments, the reinforcement fold 58 may be stitched, attached via an adhesive layer, pressed, or welded into the airbag net 34, to cite a few examples. In a preferred implementation, the folding of the reinforcement fold 58 provides the at least three overlapping layers 60, 62, 64 in the central section CS, and leaves first and second net segments 76, 78, which are a single layer each, on either side of the ends 72, 74 of the fold 58.

Figure 6:
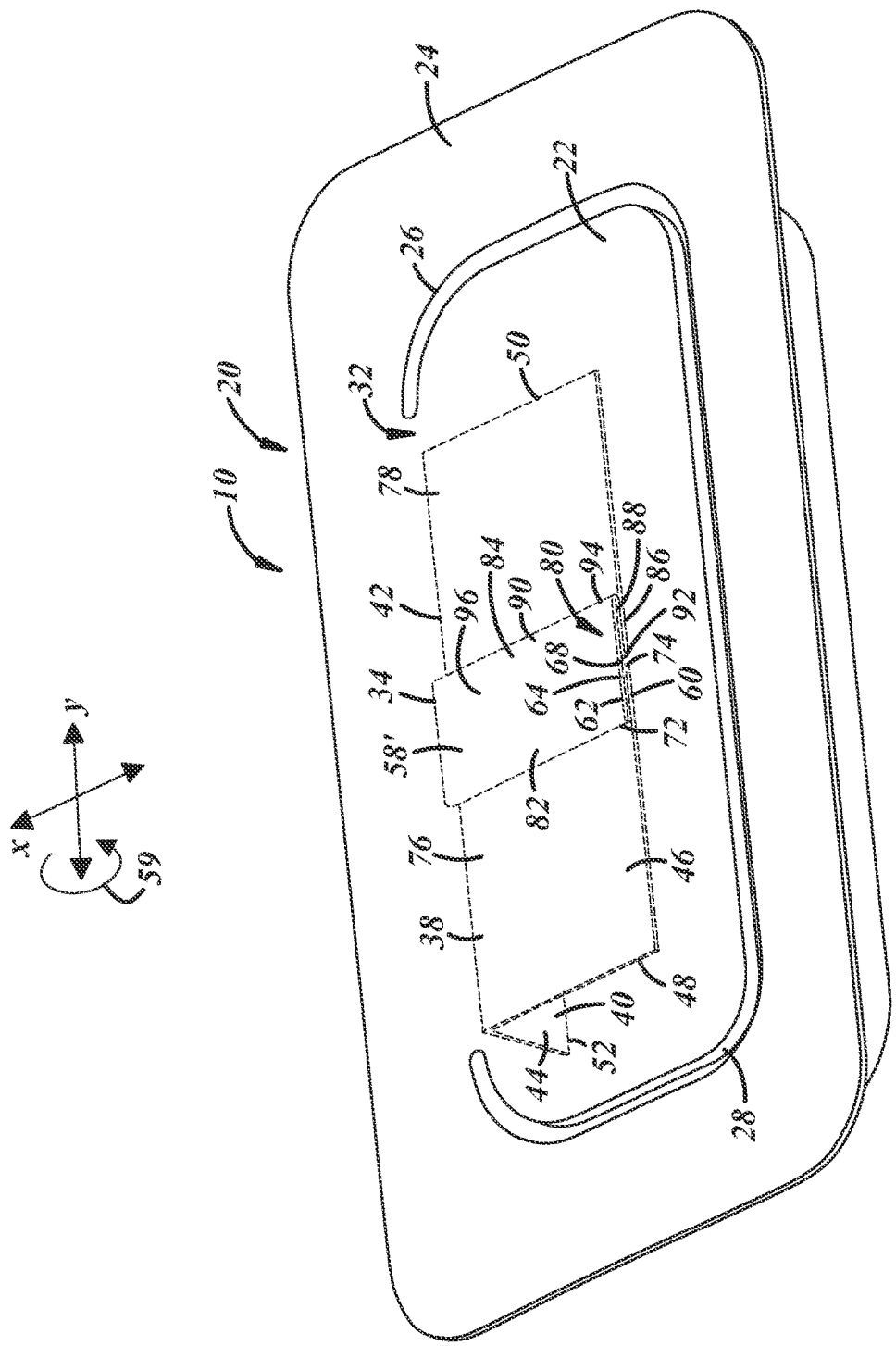
FIG. 6 shows an airbag net according to another embodiment.
Figure 7:
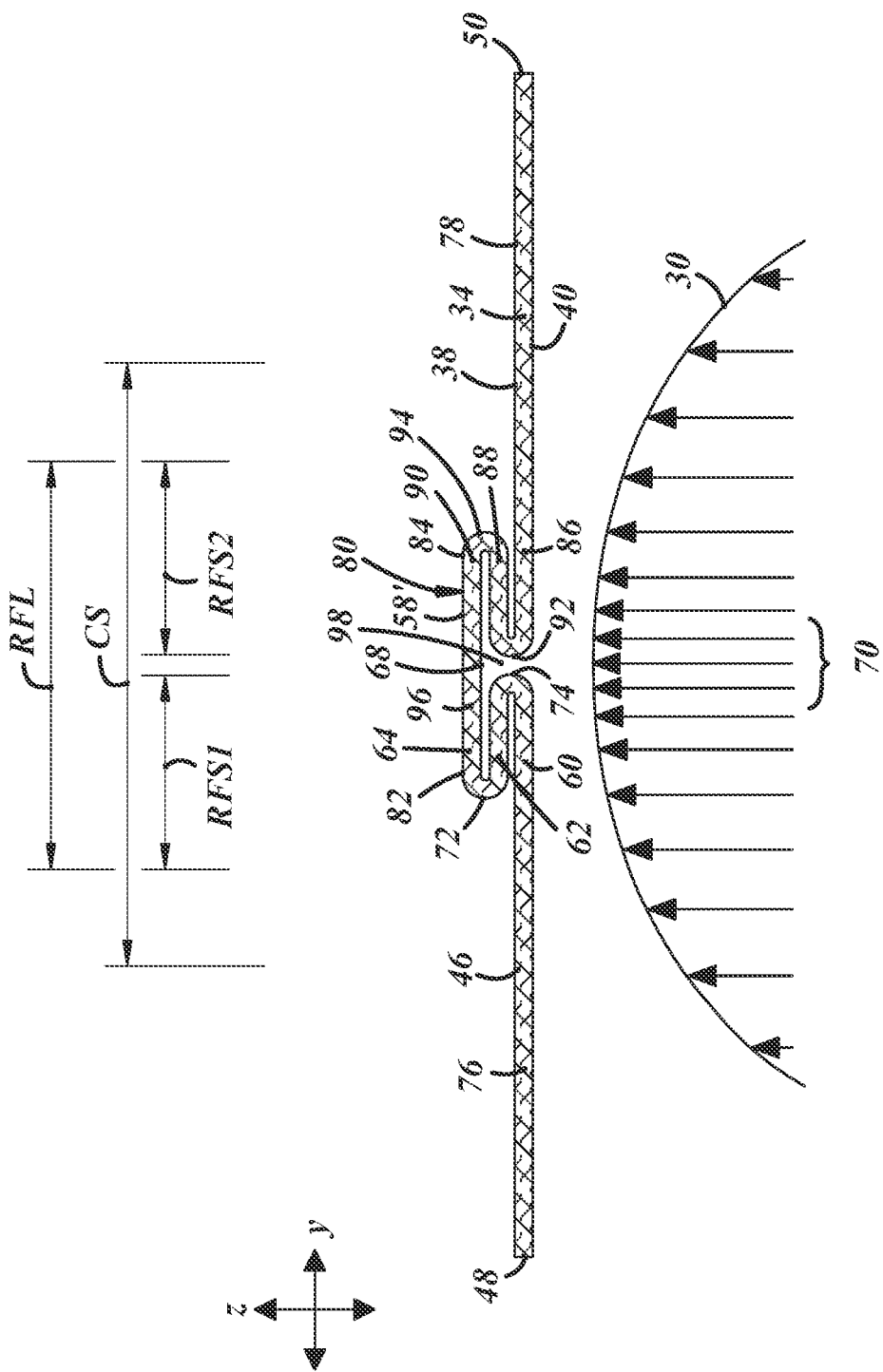
FIG. 7 is a cross-section of the airbag net of FIG. 6.

FIGS. 6 and 7 illustrate another embodiment of the reinforcement fold 58'. In this embodiment, like reference numerals are used to denote like features, and the teachings with respect to the reinforcement fold 58 of the prior figures may also be applicable to the reinforcement fold 58'. The reinforcement fold 58' has an omega-shaped cross section 80, creating two longitudinal sections 82, 84, each of which are oriented transversely, or more particularly, perpendicularly, with respect to the hinge 42. The first longitudinal section 82 has the three overlapping layers 60, 62, 64, as well as the first end 72 and second end 74. The second longitudinal section 84 also includes three overlapping layers 86, 88, 90 which form third and fourth ends 92, 94. In this embodiment, the overlapping layers 64, 90 form a continuous top portion 96 of the omega-shaped cross-section 80. This arrangement also provides for better planar alignment with respect to the single-layer first and second net segments 76, 78. A gap 98 may be situated adjacent the center point 68, which serves to at least partially delineate the first and second longitudinal sections 82, 84. In some embodiments, the longitudinal sections 82, 84 may abut or adjoin at the center point 68. Generally, the length of each longitudinal segment RFS1, RFS2 between the first and second side edges 48, 50 of the airbag net 34 is equal to half of the total length of the reinforcement fold 58' (RFL).

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all the following: "A"; "B"; "C"; "A and B"; "A and C"; "B and C"; and "A, B, and C."

The invention claimed is:

1. A vehicle interior panel, comprising:
an airbag lid configured to cover a deployable airbag;
an adjacent panel portion situated adjacent to the airbag lid; and
an airbag net having a hinge that forms between a first net segment on a first side of the hinge and a second net segment on a second, opposite side of the hinge, wherein the first net segment is coupled to the adjacent panel portion and the second net segment is coupled to the airbag lid, wherein the airbag net includes a reinforcement fold, the reinforcement fold extending through the hinge from the first net segment to the second net segment.

2. The vehicle interior panel of claim 1, wherein the reinforcement fold has at least three overlapping layers.

3. The vehicle interior panel of claim 2, wherein the reinforcement fold has an S-shaped cross-section.

4. The vehicle interior panel of claim 2, wherein the reinforcement fold has two sections, with each section having at least three overlapping layers.

5. The vehicle interior panel of claim 4, wherein the reinforcement fold has an omega-shaped cross-section.

6. The vehicle interior panel of claim 1, wherein each of the first net segment and the second net segment are a single layer of the airbag net.

7. The vehicle interior panel of claim 1, wherein the airbag net has a first side edge, a second side edge, a third side edge, and a fourth side edge, and wherein the third side edge is an end of the first net segment and the fourth side edge is an end of the second net segment.

8. The vehicle interior panel of claim 7, wherein the hinge extends fully from the first side edge to the second side edge.

9. The vehicle interior panel of claim 7, wherein the reinforcement fold extends fully from the third side edge to the fourth side edge.

10. The vehicle interior panel of claim 7, comprising a central section between the first side edge and the second side edge, wherein the central section includes a center point between the first side edge and the second side edge, the central section having a length between the first side edge and the second side edge that is less than 50% of a total distance between the first side edge and the second side edge.

11. The vehicle interior panel of claim 10, wherein the reinforcement fold is located fully within the central section.

12. The vehicle interior panel of claim 7, wherein the first side edge and the second side edge are configured to extend at least partially in an X-direction with respect to a vehicle.

13. The vehicle interior panel of claim 12, wherein a longest extent of the reinforcement fold is configured to extend at least partially in the X-direction with respect to the vehicle.

14. The vehicle interior panel of claim 1, wherein the hinge is a fold which angles the first net segment with respect to the second net segment.

15. The vehicle interior panel of claim 1, wherein the reinforcement fold is located along an initial impact zone where the deployable airbag is configured to make initial contact with the airbag lid.

\* \* \* \* \*